United States Patent [19]

Albel

[11] Patent Number: 5,078,552
[45] Date of Patent: Jan. 7, 1992

[54] GUIDE/DRILL STOP FOR REGULATING DRILL DEPTH

[76] Inventor: Frank O. Albel, P.O. Box 407, Sagamore Hills, Ohio 44067

[21] Appl. No.: 671,547

[22] Filed: Mar. 19, 1991

[51] Int. Cl.$^5$ .............................................. A23B 49/00
[52] U.S. Cl. ................................... 408/1 R; 408/113; 408/202; 408/241 S
[58] Field of Search ............... 408/202, 241 B, 241 S, 408/192, 72 R, 72 B, 113, 226, 1 R

[56] References Cited

U.S. PATENT DOCUMENTS

| | | | |
|---|---|---|---|
| 1,229,565 | 6/1917 | Ahlgren | 408/226 |
| 2,353,514 | 7/1944 | Slatter | 408/72 R |
| 2,477,891 | 8/1949 | O'Neill | 408/113 |
| 2,700,905 | 2/1955 | Urquhart | 408/113 |
| 3,000,239 | 9/1961 | Ransom | 408/113 |
| 4,168,131 | 9/1979 | Hill | 408/1 R |

FOREIGN PATENT DOCUMENTS 172828  12/1921  United Kingdom ............... 408/202

OTHER PUBLICATIONS

Wood Workers' Store 1990-91 catalog, p. 82.

*Primary Examiner*—Steven C. Bishop
*Attorney, Agent, or Firm*—Renner, Otto, Boisselle & Sklar

[57] ABSTRACT

A guide/drill stop in the form of a hollow one-piece cylindrical sleeve for frictional engagement with a cutting tool, e.g., a drill bit, to regulate the desired depth of a hole to be drilled. The guide/drill stop sleeve extends optionally over the portion of the shank of the drill bit inserted into the collet or chuck of the machine or drill to enable the collet or chuck to secure the positioning of the drill stop during drilling. Alternatively, in another embodiment, the guide/drill stop sleeve may cover only a portion of the drill bit such that the sleeve does not encompass the section of the shank of the drill bit received into the collet or chuck of the particular machine or drill. In general a drill stop, constructed of various materials in various lengths and diameters, to enable precise regulation of drilled holes of varying depth is provided.

11 Claims, 1 Drawing Sheet

GUIDE/DRILL STOP FOR REGULATING DRILL DEPTH

BACKGROUND OF THE INVENTION

1. Field of the Invention

The invention relates to a guide or drill stop useful to regulate cutting or drilling to a desired depth. More specifically, the invention is directed to a hollow cylindrical sleeve that optionally includes a rotating collar which may be made in various lengths and diameters in order to regulate the depth of cutting or drilling and may be utilized with various sizes of cutting tools, e.g., drill bits.

2. State of the Art

Cutting tools and especially drill bits are widely used in the construction, carpentry, woodworking and metal working trades and the like. Drilling, in particular, is a common operation for drilling a cylindrical hole with a one- or two-lipped straight-fluted or twist drill. (Other cutting operations include boring, reaming, Trepanning and the like.)

Machines used in drilling include manually operated and power drills as well as various types of drilling machines such as a bench drill press, an upright drill press, and a radial drill press. In all these types of machines, the spindle rotates in a sleeve or quill which does not rotate but is free to move axially to provide the necessary feed for the drill.

The straight-shank twist drills, which have a cylindrical shank of the same diameter as the drill itself, are generally held either in a three-jaw or two-jaw chuck. Most hand-held drills have three-jaw chucks. Both types of chucks are generally held by inserting an arbor in a tapered hole in the body of the chuck, which in turn is held by inserting its tapered shank in the spindle socket.

For wood drilling, in particular, it is often necessary to drill only to a specific depth. For example, where a hinge is to be attached to such members as cabinet doors, shutters and the like, it is not desirable to drill completely through such members. Furthermore, it is desired only to drill to sufficient depth for the screw to be set for purposes of strength of the seating of the screw. Various drill stops and drill stop collars have been developed to limit the depth the drill bit enters the wood or drilling material. However, the drill stops previously developed do not always give the desired precision, are not easy to manufacture, may vibrate loose during drilling, and are not necessarily easy to use or assemble.

SUMMARY OF THE INVENTION

In accordance with the invention, a relatively precise yet easy-to-manufacture, easy-to-use and inexpensive guide has been devised for determining the depth of cutting into a particular material. This guide comprises a hollow one-piece cylindrical sleeve having a predetermined length and is adapted to be received on a cutting tool, e.g., a drill bit, and frictionally retained thereon. The shank of the cutting tool is for insertion into the collet of a machine for cutting.

Further in accordance with the present invention, the preferred cutting tool is a drill bit and the machine is a drill containing a chuck for receiving the shank of the drill bit.

Still further in accordance with the present invention, a guide or drill stop is provided wherein the hollow cylindrical sleeve encompasses at least a substantial portion of the length of the shank of the drill bit whereby the sleeve will be received and gripped by the jaws of the chuck of the particular drill when the drill bit containing the sleeve is inserted into the chuck.

Still further in accordance with the present invention, the guide or drill stop is provided wherein the sleeve is produced in various lengths to allow for the precise pre-determination of the depth of the holes to be drilled with the particular drill bit and in various diameters to accommodate different size drill bits.

Still further in accordance with the present invention, a guide or drill stop is provided wherein the sleeve is produced from a material selected from the group consisting of elastomers and thermoplastics to provide sufficient static friction for the mechanical gripping action of the sleeve on the cutting tool or drill bit.

Still further in accordance with the present invention, a guide or drill stop is provided wherein the sleeve is produced from metal and includes multiple tensioning fingers around the upper perimeter of the sleeve which engage the upper portion of the shank of the drill bit and further wherein the upper shank portion is to be inserted into and received by the chuck of the drill.

Still further in accordance with the present invention, a guide or drill stop is provided wherein the sleeve includes a collar rotatably attached to a neck portion of the sleeve such that the neck portion engages a shank of the drill bit and the rotatable collar will rotate during drilling and also when the end portion of the collar contacts the surface of the material being drilled at the predetermined drilling depth.

Still further in accordance with the present invention, a guide or drill stop is provided wherein the sleeve is produced in lengths to be received on the shank of the drill bit and which do not encompass the top portion of the shank. The sleeve of this particular embodiment encompasses the portion of the shank and the cutting portion of the bit between the bottom end portion of the shank received into the chuck of the drill and the top end of the length of the cutting portion of the bit set for the predetermined depth for the hole to be drilled.

These and other aspects of the invention will become clear to those skilled in the art upon the reading and understanding of the specification.

BRIEF DESCRIPTION OF THE DRAWINGS

The invention will be further described in connection with the attached drawing FIGURES showing preferred embodiments of the invention including specific parts and arrangements of parts. It is intended that the drawings included as a part of this specification be illustrative of the preferred embodiments of the invention and should in no way be considered as a limitation on the scope of the invention.

In the annexed drawings.

DETAILED DESCRIPTION OF THE PREFERRED EMBODIMENTS

Figure 1:
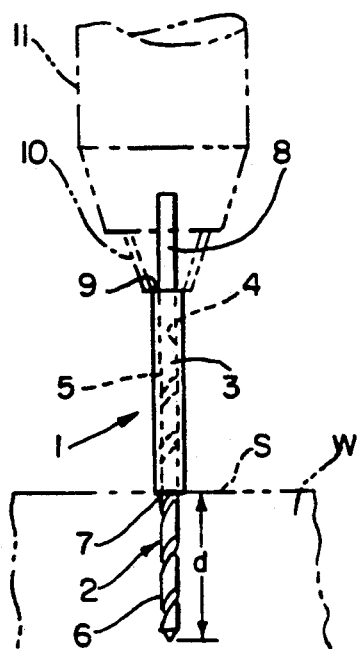
FIG. 1 illustrates one embodiment of the guide or drill stop according to the present invention which is constructed from an elastomer or thermoplastic material.

Referring now in detail to the drawings, FIG. 1 illustrates a guide or drill stop 1 in one embodiment of the present invention in combination with a drill bit 2. The guide or drill stop 1 comprises a hollow one-piece cylindrical sleeve 3 having a predetermined length and is adapted to be received on the drill bit 2 or other cutting tool. In the embodiment illustrated in FIG. 1, the guide or drill stop 1 is retained on the drill bit 2 by having the inner diameter 4 of the sleeve 3 fairly closely match the outer diameter 5 of the drill bit and constructing the sleeve 3 of a somewhat resilient, somewhat flexible elastomer or thermoplastic material which at least initially provides sufficient static friction against the tool bit to hold the guide or drill stop 1 in place. Examples of thermoplastics and elastomers that may be utilized to make the guide or drill stop 1 in accordance with the present invention include polyvinylchloride, polypropylene, polyesters, polyamides, polyacrylates, polyacrylonitriles and all the various derivatives and copolymers related to this class of elastomers, thermoplastics and the like.

The guide or drill stop 1 is positioned on the drill bit 2 such that it provides drilling depth d for cutting surface 6 of the bit 1 when the surface s of the workpiece w being drilled comes into contact with the foremost end 7 of the sleeve 3. When thus positioned, the shank portion 8 of the drill bit 2 extends beyond the rearmost end 9 of the guide 1 for insertion into and gripped by the chuck or collet 10 of a drill or drilling machine 11 shown in phantom lines in FIG. 1. It is pointed out that the guide or drill stop 1 may be employed with other cutting tools for reaming, boring and the like.

Figure 2:
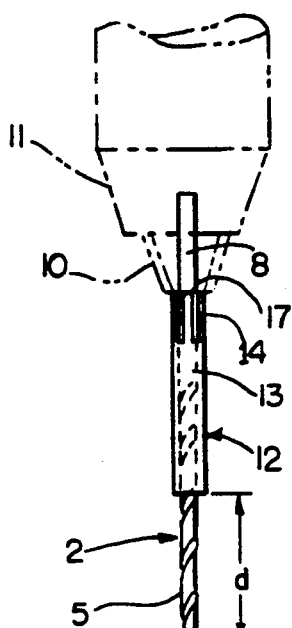
FIG. 2 illustrates another embodiment of the guide or drill stop according to the present invention which is substantially the same as that shown in FIG. 1 except that it is constructed from metal.

FIG. 2 illustrates another embodiment of the guide or drill stop 12 of the present invention which is substantially the same as that shown in FIG. 1, only the guide or drill stop 12 is constructed of metal and includes spring-like tensioning fingers 14 adjacent the upper end of the sleeve 13 to provide sufficient static friction against the shank portion 8 at least initially to hold the guide or drill stop 12 in place. The fingers 14 may be provided on the guide sleeve 13 by conventional slotting and forming operations.

Referring further to FIG. 2, guide or drill stop 12, like the drill stop 1 shown in FIG. 1, is of a predetermined length and is positioned such that drilling distance or length d is provided on cutting surface 5 of drill bit 2. Shank portion 8 of drill bit 2 extends beyond the rearmost end 17 for insertion into the chuck or collet 10 and gripping by the jaws of the chuck of the particular drill. It is important to note that in both this embodiment and the embodiment of FIG. 1, an advantage is achieved by chucking the collet 10 up against the rearmost end 9, 17 of the guide or drill stop 1, 12 as shown in phantom lines in FIGS. 1 and 2 after the guide has been properly positioned on the drill bit 2 in the manner previously described, in that in the event the guide or drill stop sleeve 3 or 13 should happen to slip during drilling, the predetermined depth will still be reached. That is, as drilling proceeds, the sleeve 3 or 13 will be pushed up against the end of the chuck 10 to stop the drilling at the predetermined depth.

Figure 3:
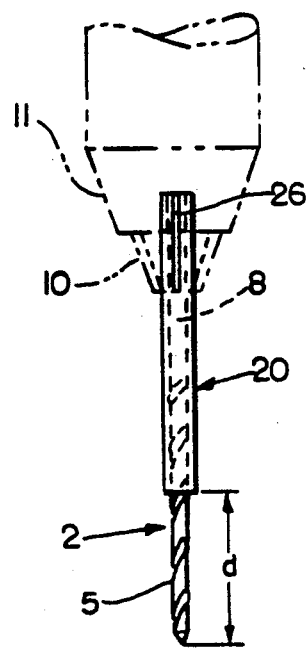
FIGS. 3 and 4 illustrate still another embodiment of the present invention wherein the guide or drill stop may be constructed from either an elastomer or thermoplastic material or metal.
Figure 4:
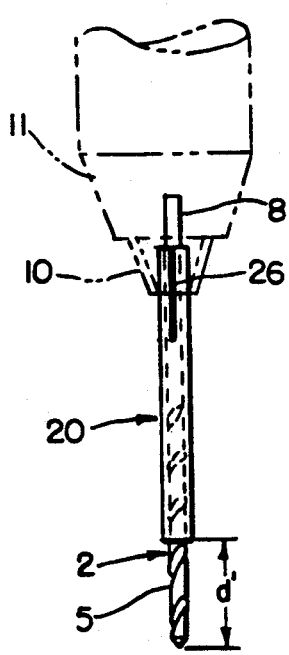

Still another embodiment of the guide or drill stop 20 in accordance with the present invention is illustrated in FIGS. 3 and 4. In this embodiment, the guide or drill stop 20 may be made from either an elastomer or thermoplastic material or metal and encompasses a substantial portion of the length of the shank 8 as well as the portion of the cutting surface 5 of the drill bit 2 up to the predetermined drilling depth d or d' of cutting surface 5. Having a substantial portion of the shank 8 of the bit 2 encompassed by guide or drill stop 20 has the advantage that a portion of the guide or drill stop 20 may be gripped by the chuck 10 of the drill 11 when inserted into the chuck for different positions of the guide or drill stop 20 along the length of the drill bit 2 as schematically shown in FIGS. 3 and 4 to positively retain the drill stop in place. For increased gripping action, the rearmost portion of the length of the drill stop 20 may be provided with circumferentially spaced slots 26 thereon.

Figure 5:
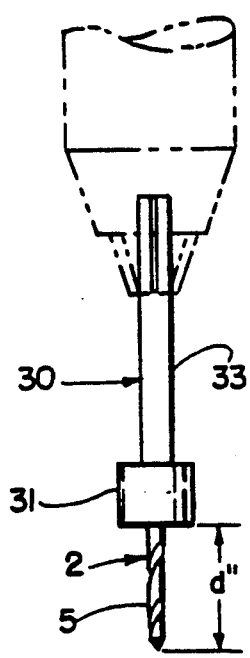
FIG. 5 illustrates yet another embodiment of the present invention wherein the guide or drill stop includes a rotatable collar.

FIG. 5 shows yet another embodiment of the guide or drill stop 30 in accordance with the present invention. In this particular embodiment, the guide or drill stop 30 has a collar 31 which is rotatable around the guide or drill stop sleeve 33. Sleeve 33 may be made out of a suitable elastomer or thermoplastic material or made out of metal and provided with spring-like tensioning fingers at its upper end to produce minimal static friction against the shank portion 8 at least initially to hold the guide or drill stop in place similar to the guides 1 and 12 shown in FIGS. 1 and 2. Alternatively, the sleeve 33 may have such a predetermined length that when it is slipped over the shank 8 of the drill bit 2 and properly positioned thereon, the sleeve 33 will cover a substantial portion of the length of the shank 8 whereby a portion of the sleeve will be gripped by the jaws of the chuck 10 when the drill bit 2 is inserted in the chuck to securely hold the sleeve in place as schematically shown in FIG. 5.

Figure 6:
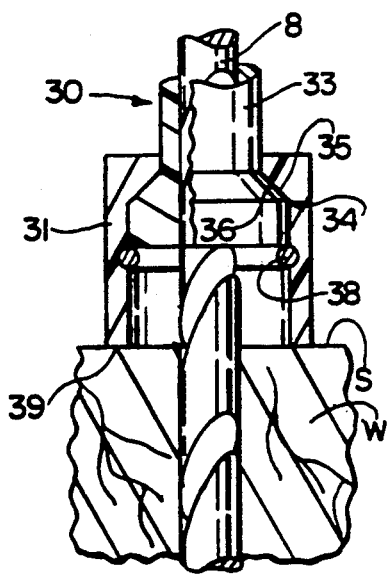
FIG. 6 is an enlarged longitudinal fragmentary section through the embodiment of FIG. 5.

FIG. 6 is an enlarged longitudinal section through the guide or drill stop 30 of FIG. 5 where the collar 31 is rotatably connected to sleeve 33 at 34. To that end, sleeve 33 may have an external shoulder 35 at its forwardmost end which is engaged by an internal shoulder 36 on the collar 31 when collar 31 is inserted over the sleeve 33 and retained in place as by means of a snap ring 38. The overlapping surfaces of the sleeve 33 and collar 31 may optionally be coated with a layer of Teflon to further reduce frictional contact therebetween. The collar 31 will rotate with the sleeve 33 during drilling and will permit the sleeve 33 to rotate relative to the collar 31 when the lowermost end 39 of collar 31 contacts the surface s of the material w being drilled.

From the foregoing, it will be apparent that the guides or drill stops in accordance with the present invention are all hollow cylindrical sleeves which fit over the drill bit or cutting tools depending on the particular cutting operation. The sleeves in accordance with the present invention may be produced in various lengths to allow for the precise predetermination of the depth of holes to be drilled or cutting to take place and are further reproduced in various diameters to accommodate various size drill bits or cutting tools. Such sleeves having predetermined lengths provide a method for cutting or drilling holes of precisely predetermined depths or distances without causing damage to the particular material being cut or drilled. If the sleeves are initially too long for the intended drilling depth, they may easily be cut or trimmed to the desired length. Furthermore, the guides or drill stops according to the present invention are easy to assemble with the drill bit or cutting tool. Specifically the guides or drill stop sleeves are at least initially frictionally retained on the cutting tool or drill bit and/or positively gripped by the chuck of the drill and thus, are easy to assemble on the cutting tool or drill bit and because of their simplicity of design are easy to manufacture.

While the invention has been described and illustrated with reference to certain preferred embodiments thereof, those skilled in the art will appreciate that various changes, modifications and substitutions can be made therein without departing from the spirit of the invention. For example, the guides or drill stops of the present invention may be utilized for boring and reaming operations. Accordingly, such expected changes and variations and results are contemplated in accordance with the objects and practices of the present invention. It is intended, therefore, that the invention be limited only by the scope of the claims which follow.

I claim:

1. A cutting tool stop, comprising:
   a cylindrical sleeve portion for fitting snugly over a cutting tool, said sleeve portion having an external shoulder;
   a tubular collar portion fitted over said sleeve portion and having an internal shoulder engaging said external shoulder; and
   a retaining means within said collar portion and co-acting with said sleeve portion so as to allow relative rotation between said collar portion and said sleeve portion and prevent relative axial movement therebetween.

2. The cutting tool stop of claim 1 wherein said sleeve portion is frictionally retained on a shank portion of a cutting tool.

3. The cutting tool stop of claim 1 wherein said sleeve has a predetermined length.

4. The cutting tool stop of claim 1 wherein said sleeve is received by and gripped by a collet of a three jaw chuck on a drilling tool.

5. The cutting tool stop of claim 4 wherein said sleeve portion is produced from a material selected from the group consisting of elastomers, thermoplastics, and metals, wherein said material allows for the construction of said sleeve portion to provide sufficient static friction for mechanical gripping to a cylindrical surface of a cutting tool.

6. A cutting tool stop according to claim 5 wherein said sleeve portion is produced from an elastomer or thermoplastic material.

7. A cutting tool stop according to claim 6 wherein said sleeve portion is produced from a metal.

8. A method of drilling holes to a predetermined depth in a workpiece, using a cutting tool having a shank for insertion into a collet of a machine and a section having cutting means thereon projecting from one end of said shank, further comprising a stop including a hollow cylindrical sleeve received on said shank and frictionally retained thereon, wherein said stop has a predetermined length, the method including the steps of:
   placing the stop on the shank;
   initiating drilling of the hole;
   allowing a foremost end of the stop to engage the workpiece;
   continuing drilling of the hole such that the stop slides on the shank until an opposite end of said stop engages said collet;
   whereby the intrusion progress of said cutting means is arrested by said foremost end of the stop.

9. The method according to claim 8 wherein said sleeve includes a collar pivotally attached to a neck section of said sleeve, wherein said neck section engages said shank of said drill bit and said pivotal collar will rotate during drilling and when said end section of said collar contacts the surface of the material being drilled at the predetermined drilling depth.

10. The method of claim 8 wherein said sleeve is produced from a material selected from the group consisting of elastomers, thermoplastics and metals where said material allows for the construction of said sleeve to provide sufficient static friction for mechanical gripping action upon the surface of the shank of said drill bit.

11. The method of claim 8 wherein said sleeve is reproduced in various lengths to allow for the precise predetermination of the depth of holes to drill with said drill bit and is reproduced into various diameters to accommodate for the various size drill bits.

* * * * *